(No Model.)

M. GROSS.
MODE OF PROTECTING SUPERHEATING PIPES.

No. 278,537. Patented May 29, 1883.

WITNESSES:
W. W. Hollingsworth
A. L. Syne

INVENTOR:
Magnus Gross
BY Mann & Co.
ATTORNEYS.

UNITED STATES PATENT OFFICE.

MAGNUS GROSS, OF NEW YORK, N. Y.

MODE OF PROTECTING SUPERHEATING-PIPES.

SPECIFICATION forming part of Letters Patent No. 278,537, dated May 29, 1883.

Application filed April 14, 1883. (No model.)

*To all whom it may concern:*

Be it known that I, MAGNUS GROSS, of New York city, in the State of New York, have invented a new and useful Mode of Protecting Steam-Superheating and other Pipes, of which the following is a full, clear, and exact description, reference being had to the annexed drawings, forming part of this specification.

In another application for patent I have shown an improved steam-superheater for gas-making, in which I have employed pipes which are coated and covered in a novel manner to render them more durable. My present application relates to the improved mode of thus preparing the pipes, considered apart from any special use to which they are adapted.

Figure 1:
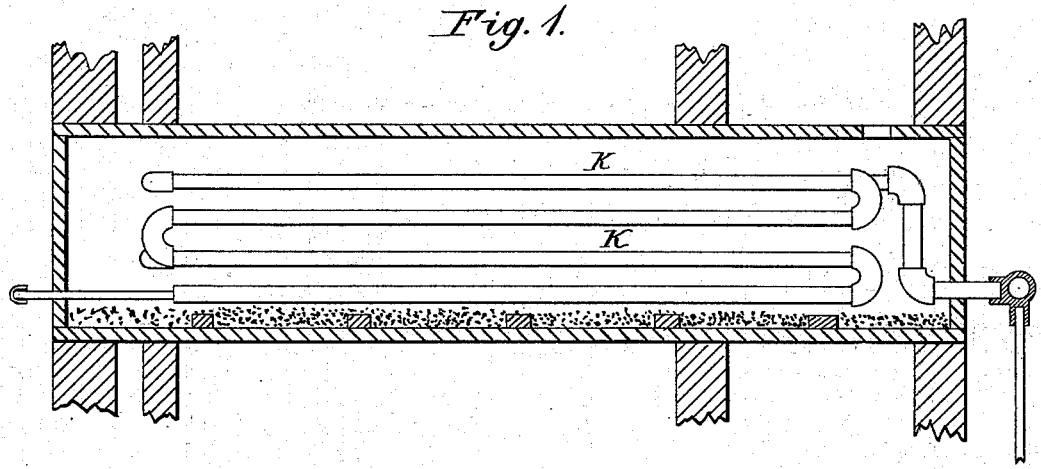
Figure 2:
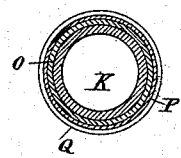

In the drawings, Figure 1 is a sectional side elevation of a superheater, and Fig. 2 is a cross-section of one of the pipes.

In preparing the pipe K, with its protecting coatings and coverings, it is first to be carefully rubbed inside and outside with finely-ground dry plumbago until no more of the substance will adhere to the iron. Pads of hair-felt—such as is used in covering boilers and steam-pipes—are then cut into strips O, two or three inches wide and half an inch thick, and are coated upon the inner surface with a thick paste made of plumbago and warm water. The strips O, thus prepared, are wound around the pipe K, so as to form a continuous covering therefor. To the outer surface of the wound strips O is applied strong but not too stiff asbestus paper cut into strips P, and thickly coated on the inner surface with the plumbago paste. The strips of felt and asbestus paper are then secured in place by iron wire Q, wound around them and the pipe K. The pipe thus prepared receives a final coating of a wash made of powdered plumbago, fire-clay, and warm water.

When the pipes are used in superheaters the parts that are to be subjected to incandescence may be wrapped collectively with an additional covering composed of sheets of asbestus paper coated inside and outside with plumbago and clay paste, and secured in place by strong wire wrapped around the same, as described in my application relating to superheaters, to which I have before referred.

The pipe K, as above prepared, is practically indestructible, since it cannot be attacked by fire, gases, hot air, or vapors in steam-heating, while the carbonization of the hair-felt secures a free space into which the pipe can expand as it becomes enlarged by the absorption of carbon abundantly provided by the plumbago coatings.

What I claim is—

The mode of protecting steam-superheating and other pipes, substantially as herein shown and described, which consists in coating the pipes inside and outside with dry plumbago, covering the pipes singly with strips of hair-felt coated upon the inner side with plumbago-paste, covering the felt with strips of asbestus paper coated upon the inner side with plumbago-paste and washed upon the outer side with a mixture of plumbago, pulverized fire-clay, and water, and securing the hair-felt and asbestus paper in place with wire, substantially as set forth.

MAGNUS GROSS.

Witnesses:
JAMES T. GRAHAM,
C. SEDGWICK.